Feb. 9, 1960
C. SWENSON
2,924,680
LIGHT CONTROLLING SWITCH FOR VEHICLES
Filed Nov. 4, 1957
2 Sheets-Sheet 1
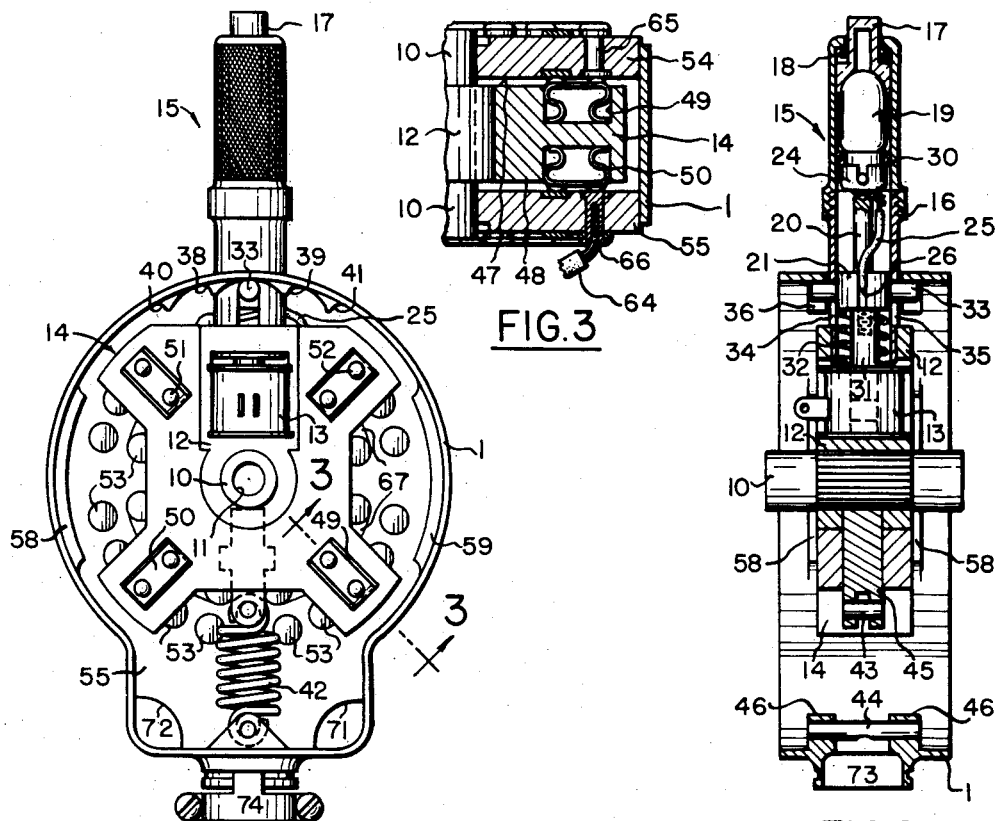
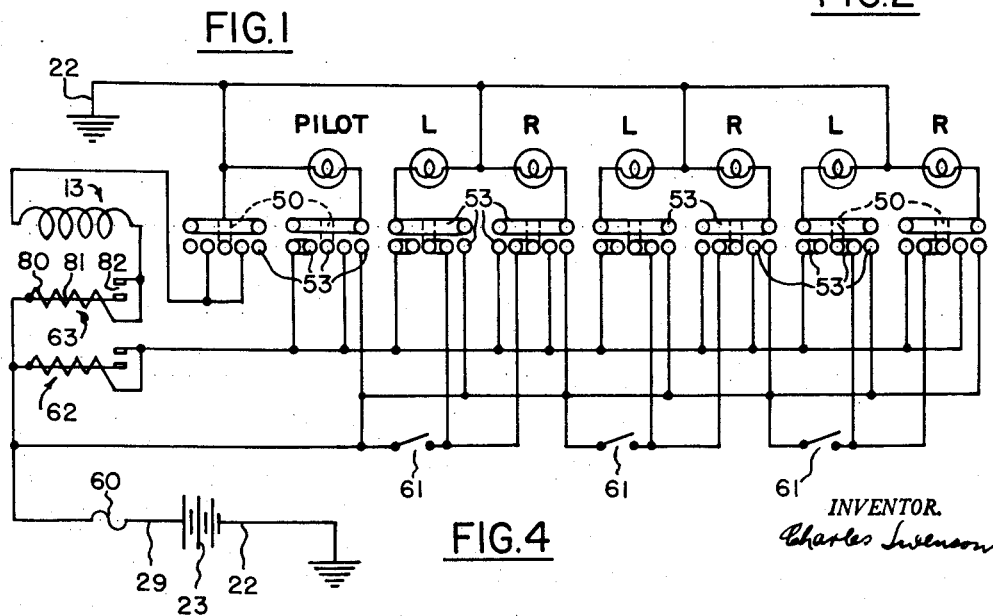
INVENTOR.
Charles Swenson

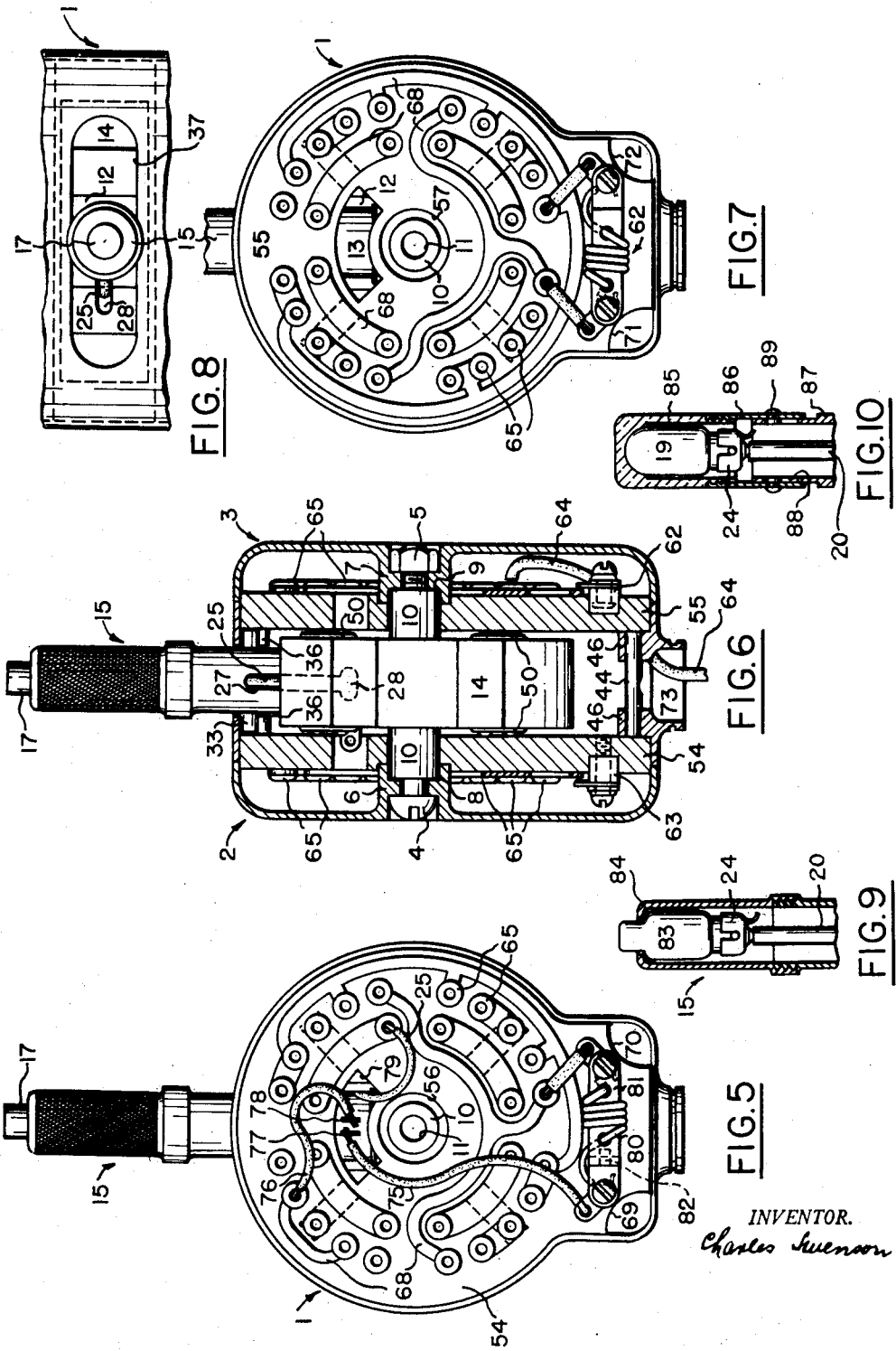

United States Patent Office 2,924,680
Patented Feb. 9, 1960

2,924,680

LIGHT CONTROLLING SWITCH FOR VEHICLES

Charles Swenson, New York, N.Y.

Application November 4, 1957, Serial No. 694,283

20 Claims. (Cl. 200—61.3)

My invention relates to improvements in light controlling switches for vehicles, such as automobiles and trucks, and particularly to the so called self resetting or self cancelling switches, enabling a driver, when he wishes to make a turn, to put on a number of turn indicating signals, and rely on the switch to put out these signals automatically, when the turn is completed.

An object of my invention is to provide a multiple position switch in the above class to control in cooperation with already existing switches in a vehicle the turn indicating signals mentioned above, and in addition the marker or clearance lights and the emergency signals by displacement of a single operating handle from an off or neutral position, to which it may be returned either automatically by energy furnished by the vehicle battery, or manually by a momentary pressure on a push button, which is conveniently located and illuminated to advise the driver of the manner, in which the vehicle lights are functioning.

Another object is to provide a switch with a simple and reliable mechanism, in which some of the parts are made identical to lower the production cost of the switch relative to its usefulness.

A further object is to provide a switch, that may be assembled and readily attached to various mounting means by a single screw.

Other objects and advantages of my improvements will appear as the specification proceeds.

I attain these objects by the mechanism illustrated in the accompanying drawings, in which Fig. 1 is a plan view of the switch as it appears after the removal of a cover and a terminal board, Fig. 2 is a longitudinal section through handle, contact block and center housing; Fig. 3 is a cross section taken on the line 3—3 in Fig. 1, through the switch with the covers removed; Fig. 4 is an electrical diagram showing the receptive devices in the circuit; Fig. 5 is a plan view of the switch with a cover removed; Fig. 6 a longitudinal section through center housing, covers and terminal boards; Fig. 7 a view similar to Fig. 5, but from the opposite side; Fig. 8 is an end view of the handle and part of the center housing and Figs. 9 and 10 are longitudinal sections of the hollow handle showing modifications.

Similar reference numerals refer to similar parts in all the views.

Referring now to the drawings, the mechanism is enclosed in a center housing 1, to which identical covers 2, 3 are fastened in assembled relation by means of a screw 4 and nut 5, the screw passing through inwardly extending bosses 6, 7, which are integral with the covers and provided with recesses 8, 9 to act as bearings for the ends of a pivot stud 10, the latter having a hole 11 for passage of the assembly screw 4. The pivot stud 10 is inserted into a frame like part 12 adapted to support a solenoid 13 and molded into a Bakelite contact block 14; a tubular handle 15 is fitted into the frame 12 and may be secured by peening; the handle is divided into two parts and screwed together at 16, so that ready access may be had to parts inside the handle. Starting from the outer end, the handle contains a hollow push button 17, preferably of translucent plastic material projecting outside the handle and just inside embraced by a spring 18, which holds it against the bulb of a pilot lamp 19 so as to establish electrical contact between the center contact point of the lamp and a centrally placed rod 20 with an expansion 21 fitting slidingly within the handle. The electrical connection is continued through other metal parts of the switch and through suitable mounting brackets, which are not shown, by means of which, and the assembly screw 4, the switch may be mounted in the traditional manner on parts of the vehicle, which are "grounded" or connected to the negative side 22 of the vehicle battery 23. A contact making brass spring clip 24 is fitted to the pilot lamp base and an insulated flexible wire 25 soldered thereto and laid in a groove 26 in the expansion 21, passed through a slot 27 in the handle wall and into a cavity 28 in the contact block 14 and frame 12, and out through the latter, to be connected to the positive side 29 of the battery 23. A washer 30 of insulating material is also fitted on the pilot lamp base to center the lamp within the handle and prevent short circuiting of the lamp filament. A plunger 31 is screwed on to the rod 20 to enter the solenoid 13 and is embraced by a spring 32, which exerts a greater force in an outward direction than the spring 18. The spring 32, acting against the solenoid 13 and the expansion 21, biases a pin 33, which is passed through the latter and projects outside the handle through slats 34, 35 in the handle wall, to follow the contours of a cam 36, when the handle is displaced. The cam extends inward from the housing wall, which is here circular in configuration and concentric with the pivot stud 10, and on both sides of an oblong hole 37 for the handle, the semicircular ends of the hole 37 serving as extreme stops for the handle. At angular distances 15° and 30° to the left and to the right of center, the cam 36 is provided with notches 38, 39, 40, 41 for the follower pin 33 to enter and latch the handle in these positions. Pressure on the push button 17 releases the follower pin, and action by a coil spring 42, which is suspended from pins 43, 44 respectively in a bracket 45, molded into the contact block 14, and in a pair of ears 46 in the housing wall, will cause contact block and handle to return to the center position. When the solenoid 13 is energized the plunger 31 will be drawn into it, causing a like effect as pressure on the push button, and the handle, if in a 15° off center position, will return to center automatically.

In either of surfaces 47, 48 of the contact block 14 rectangular, radial recesses 49 are formed to contain resilient brass contacts 50, each contact having two extrusions 51, 52 designed to make electrical contact with isolated contact surfaces, such as 53 in two identical Bakelite terminal boards 54, 55, one of which is placed on either side 47, 48 of the contact block 14. The bosses 6, 7 in the covers 2, 3 enter shallow holes 56, 57 in the terminal boards to hold them, by means by the assembly screw 4 and nut 5, against the cam 36, the ears 46 and heavy portions 58, 59 of the housing wall, in which position a suitable tension exists between the contacts 50 and contact surfaces 53. The contact surfaces 53 are arranged in groups in the terminal boards and disposed radially on the two arcs described by the contact points 51, 52 on the contacts 50, such that within each group a contact surface 53 on one arc is bridged to one on the other arc by the contacts 50 in each of the five positions of the handle. The contact surfaces situated on the inner arc within each group are wired collectively to a vehicle lamp, or to the pilot lamp, or to ground as the case may be, while the contact surfaces 53 on the outer arc are wired, either directly through a fuse 60 to the positive side 29 of the battery 23, or with an external switch 61, or with a flasher 62, or with a bimetallic thermostat 63 in series with fuse and battery. Conducting wires such as 64 are soldered directly to rivets 65 in the terminal boards, as shown at 66 and the rivet heads or connecting lugs, such as 67 serve as the contact surfaces 53. Other lugs, such as 68 are used on the outer side of the terminal boards to connect some of the rivets 65 in accordance with the diagram in Fig. 4 and in order to reduce wiring and soldering work. The wires 64 are passed through openings 69, 70, 71, 72 in the terminal boards 54, 55 and collected into a cable, they are then passed through a cable opening 73 in the center housing and may be secured by a cable clamp 74.

The bimetallic thermostat 63 is fastened on the outer side of the terminal board 54 and lugs 77, 78 extending from the solenoid and accessible through a cut out 79 in the terminal board 54 are provided for flexible wire connection (not shown) in the thermostat 63, when current is passed through a resistance wire 80 wound about a piece of bimetal 81, the latter, when reaching a certain temperature will bend and make contact at 82, thereby excluding the resistance 80 from the circuit and permitting the current to energise the solenoid 13. The time elapsing before this action must correspond to the time allotted to the operation of the turn signals, and the resistance 80 and bimetal 81 are chosen to meet this requirement. The flasher 62 is similarly supported on terminal board 55 and causes the lamps, to which it is connected, to flash on and off at frequent intervals.

In the modification of the handle release mechanism shown in Fig. 9 the bulb of a pilot lamp 83 projects through a resilient washer 84 outside the handle 15 to take the place of a push button, and in Fig. 10 the hollow handle is divided into an outer translucent part 85 abutting and centering the pilot lamp 19 within the handle and screwed on to a central part 86, which slides over an inner part 87 the latter having guiding slots 88 to receive pins 89 carried by the part 86 to limit its outward movement.

Turning now to the circuit diagram in Fig. 4 the vehicle lamps are shown in pairs and designated L or R according to their place on the left or on the right side of the vehicle. The position of the movable contacts 50, shown in dotted lines, also indicates the position of the handle, which is represented in the diagram to be in the center or neutral position. It will be seen that, in this position of the handle, the vehicle lamps are all controlled by the external switches 61, which are assumed to be already present in the vehicle, and one or more pairs of lamps may be on or off at a time.

The diagram also shows, that when the handle is displaced to the next position or 15° to the left, the 3 left lamps will flash, while the 3 right lamps will remain under control of their separate switches 61.

Similarly with the handle in the 15° to the right position the 3 right lamps now flash and the 3 left lamps are under control of their switches 61.

In the two 15° off center positions of the handle the solenoid circuit is closed, and the handle will return to center automatically after the mentioned time delay or it may be if desired released before time by action on the push button.

In the 30° to the left position of the handle all the lamps will flash simultaneously, and they will all be illuminated steadily, when the handle is in the 30° to the right position.

Pressure on the push button is required to release the handle from the extreme positions.

The pilot lamp will be off, while the handle is in the neutral or center position, in the 30° to the right position of the handle it will be on steadily, and in all other positions of the handle the pilot will flash, thus reflecting the operation of the vehicle lamps.

While I have shown a preferred embodiment of my invention, it should be understood, that changes and modifications may be made without departing from the scope of the claims hereto appended.

I claim:

1. In a light controlling switch for vehicles: a center housing; two identical covers having an inwardly extending boss with a hole and recess for assembly means; a block of insulating material adapted for limited rotation in the center housing and carrying radially disposed and spaced apart spring contacts in opposite surfaces perpendicular to the axis of rotation; a hollow pivot stud fixed in said contact carrying block and suspended for rotation in bearings in said bosses; a hollow handle attached to said contact block and extending outside the center housing; an outwardly spring biased sliding member within the handle having opposite projections extending therefrom through the handle wall and parallel to the axis of rotation; a cam or latch plate in the center housing wall on either side of the opening therein for the handle with recesses to receive said projections, so as to latch the handle in a normal position and in positions angularly displaced therefrom; a coil spring suspended in the center housing to bias the handle toward said normal position; a push button in contact with said sliding member and projecting outside the handle end to release the handle from its latched positions; a terminal board with a hole for said pivot stud supported in the center housing on either side of said contact block and in parallel and spaced relation with the contact carrying surfaces thereof and having a plurality of isolated contact members supported therein and disposed radially on two concentric circles, said contact members adapted for soldering to connecting wires on the outside of the boards and having engageable contact surfaces on the inside thereof, each contact in said contact block electrically connecting a pair of radially aligned contact members in a terminal board, when the handle is in a latched position.

2. A light controlling switch for vehicles as set forth in claim 1 including an automatic handle release mechanism comprising: a magnetic plunger attached so the inner end of said outwardly spring biased sliding member in the handle; a coacting solenoid carried by said contact block and a bimetallic thermostat supported on a terminal board and having a resistance in touch with the bimetal, said resistance and solenoid connected in a vehicle battery circuit in parallel with the other receptive devices therein, to cause upon energization the exclusion from the circuit after a time delay of said resistance and the consequent action of the solenoid on said plunger to release the handle from its latched positions.

3. In a light controlling switch for vehicles: a casing; a block of insulating material adapted for limited rotation therein and carrying radially disposed and spaced apart contacts in opposite surfaces perpendicular to the axis of rotation; a hollow handle attached to said contact block and extending outside the casing; an outwardly spring biased sliding member within the handle carrying a pin projecting therefrom through the handle wall parallel to the axis of rotation; a cam or latch plate in the casing wall on either side of the opening therein for the handle with recesses to receive said pin to latch the handle in a normal position and in positions angularly displaced therefrom; a spring suspended in the casing to bias the handle toward said normal position; means for transmitting an inwardly directed manual force to said sliding member to release the handle from its latched positions; a terminal board supported in the casing on either side of said contact block and in parallel and spaced relations with the contact carrying surfaces thereof and having a plurality of isolated contact members supported therein and disposed radially on two concentric circles, said contact members adapted for soldering to connecting wires on the outside of the boards and having engageable contact surfaces on the inside thereof, each contact in said contact block electrically connecting a pair of radially aligned contact members in a terminal board, when the handle is in a latched position.

4. In a light controlling switch for vehicles: a casing; a block of insulating material adapted for limited rotation therein and carrying radially disposed and spaced apart contacts in opposite surfaces perpendicular to the axis of rotation; a hollow handle attached to said contact block and extending outside the casing; an outwardly spring biased sliding member within the handle; a latch projecting through the handle wall from said sliding member in fixed relation thereto; a latch plate in the casing with recesses to receive said latch to hold the handle in a normal position and in positions angularly displaced therefrom; resilient means in the casing to bias the handle toward said normal position; means for transmitting an inwardly directed manual force to said sliding member to release the handle from its latched positions; a terminal board supported in the casing on either side of said contact block and in parallel and spaced relation with the contact carrying surfaces thereof and having a plurality of isolated contact members supported therein and disposed radially on concentric circles, said contact members adapted for soldering to connecting wires on the outside of the boards and having engageable contact surfaces on the inside thereof, each contact in said contact block electrically connecting a set of radially aligned contact members in a terminal board, when the handle is in a latched position.

5. A light controlling switch for vehicles as set forth in claim 12 including an automatic handle release mechanism comprising: a magnetic plunger; a coacting solenoid, and a bimetallic thermostat having a resistance in touch with the bimetal, said resistance and solenoid connected in a vehicle battery circuit to cause when energized action of the solenoid on said plunger after a time delay, and means for applying said magnetic action to release the handle from its latched positions.

6. A light controlling switch for vehicles as set forth in claim 4 including an automatic handle release mechanism comprising: a magnetic plunger; a coacting solenoid, and a bimetallic thermostat having a resistance in touch with the bimetal, said resistance and solenoid connected in a vehicle battery circuit to cause when energized action of the solenoid on said plunger after a time delay, and means for applying said magnetic action to release the handle from its latched positions.

7. In a light controlling switch for vehicles: a casing; a block of insulating material adapted for limited rotation therein and carrying spaced apart contacts in opposite surfaces perpendicular to the axis of rotation; a hollow handle attached to said contact block and extending outside the casing; a spring biased sliding member within the handle; a latch projecting from said sliding member; a latch plate with recesses to receive said latch to hold the handle in a normal position and in positions angularly displaced therefrom; means for transmitting a manual force to said sliding member to release the handle from its latched positions, a terminal board supported in the casing on either side of said contact block and in parallel and spaced relation with the contact carrying surfaces thereof and having a plurality of isolated contact members supported therein, said contact members adapted for wiring on the outside of the boards and having engageable contact surfaces on the inside thereof, each contact in said contact block electrically connecting contact members in a terminal board, when the handle is in a latched position.

8. In a light controlling switch for vehicles as set forth in claim 7 resilient means to bias the handle toward said normal position.

9. A light controlling switch for vehicles as set forth in claim 8 including an automatic handle release mechanism comprising: a magnetic plunger; a coacting solenoid, and a bimetallic thermostat including a resistance, said resistance and solenoid connected in a vehicle battery circuit to cause when energized action of the solenoid on said plunger after a time delay, and means for applying said magnetic action to release the handle from its latched positions.

10. A light controlling switch for vehicles as set forth in claim 7 wherein the contact block carries contacts in one of said parallel surfaces only and only one terminal board is supported in the casing.

11. In a light controlling switch for vehicles as set forth in claim 10 resilient means to bias the handle toward said normal position.

12. A light controlling switch for vehicles as set forth in claim 11 including an automatic handle release mechanism comprising: a magnetic plunger; a coacting solenoid, and a bimetallic thermostat including a resistance, said resistance and solenoid connected in a vehicle battery circuit to cause when energized action of the solenoid on said plunger after a time delay, and means for applying said magnetic action to release the handle from its latched positions.

13. A light controlling switch for vehicles as set forth in claim 7 wherein said contact block carries transversely interconnected contacts, so as to electrically connect contact members in one terminal board with contact members in the other terminal board, when the handle is in a latched position.

14. In a light controlling switch for vehicles as set forth in claim 13 resilient means to bias the handle toward said normal position.

15. A light controlling switch for vehicles as set forth in claim 14 including an automatic handle release mechanism comprising: a magnetic plunger; a coacting solenoid, and a bimetallic thermostat including a resistance, said resistance and solenoid connected in a vehicle battery circuit to cause when energized action of the solenoid on said plunger after a time delay, and means for applying said magnetic action to release the handle from its latched positions.

16. In a light controlling switch for vehicles wherein connections are made, when an operating handle, pivoted in the switch casing and extending outside thereof, is displaced into latched positions from a normal position: a hollow operating handle; a spring biased sliding member therein; a latch projecting from said sliding member; a latch plate with recesses to receive said latch, and means to transmit a manual force to said sliding member to release the handle from its latched positions, said means to include a pilot light energized by a vehicle battery and disposed slidingly in the handle, its bulk projecting from the handle end to function as an illuminated push button.

17. In a light controlling switch for vehicles wherein connections are made, when an operating handle, pivoted in the switch casing and extending outside thereof, is displaced into latched positions from a normal position: a hollow operating handle; a spring biased sliding member therein; a latch projecting from said sliding member; a latch plate with recesses to receive said latch and means to transmit a manual force to said sliding member to release the handle from its latched positions; a magnetic plunger; a coacting solenoid, and a bimetallic thermostat including a resistance, said resistance and solenoid connected in a vehicle battery circuit to cause when energized action of the solenoid on said plunger after a time delay; means for applying said magnetic action to release the handle from its latched positions, and resilient means to bias the handle toward said normal position.

18. In a light controlling switch for vehicles as set forth in claim 17, said manual handle release means to include a pilot light energized by a vehicle battery and disposed slidingly in the handle, its bulb projecting from the handle end to function as an illuminated push button.

19. In a light controlling switch for vehicles as set forth in claim 17, said manual handle release means to include a pilot light energized by a vehicle battery and disposed slidingly in the handle end to function as an illuminated push button.

20. In a light controlling switch for vehicles as set forth in claim 17 a pilot light energised by a vehicle battery and disposed slidingly in the handle to transmit an inwardly directed manual force to said sliding member to release the handle from its latched positions.

References Cited in the file of this patent

UNITED STATES PATENTS

| | | |
|---|---|---|
| 1,043,942 | Kimble | Nov. 12, 1912 |
| 1,509,201 | Gaynor | Sept. 23, 1924 |
| 1,568,092 | Seng | Jan. 5, 1926 |
| 2,069,382 | Morton et al. | Feb. 2, 1937 |
| 2,120,876 | Trautner | June 14, 1938 |
| 2,535,384 | Batt | Dec. 26, 1950 |
| 2,605,849 | Bordelon | Aug. 5, 1952 |
| 2,710,317 | Pearl | June 7, 1955 |
| 2,816,191 | Epstein | Dec. 10, 1957 |

UNITED STATES PATENT OFFICE

CERTIFICATE OF CORRECTION

Patent No. 2,924,680                                                February 9, 1960

Charles Swenson

It is hereby certified that error appears in the printed specification of the above numbered patent requiring correction and that the said Letters Patent should read as corrected below.

Column 2, line 32, for "slats" read -- slots --; column 5, line 34, for the claim reference numeral "12" read -- 3 --; column 6, line 53, for "bulk" read -- bulb --.

Signed and sealed this 4th day of October 1960.

(SEAL)
Attest:

KARL H. AXLINE
Attesting Officer

ROBERT C. WATSON
Commissioner of Patents